United States Patent (12) United States Patent
Oh (10) Patent No.: US 10,247,572 B2
(45) Date of Patent: Apr. 2, 2019

(54) METHOD AND APPARATUS FOR PROVIDING ROUTE BASED ON SURVEILLANCE ZONES

(71) Applicant: Hanwha Techwin Co., Ltd., Changwon-si (KR)

(72) Inventor: JaeYoon Oh, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 205 days.

(21) Appl. No.: 15/350,308

(22) Filed: Nov. 14, 2016

(65) Prior Publication Data
US 2017/0199052 A1 Jul. 13, 2017

(30) Foreign Application Priority Data

Jan. 11, 2016 (KR) .................... 10-2016-0003323

(51) Int. Cl.
| | |
|---|---|
| *G01C 21/36* | (2006.01) |
| *G01C 21/34* | (2006.01) |
| *H04L 29/08* | (2006.01) |
| *B60R 1/00* | (2006.01) |

(52) U.S. Cl.
CPC ..... *G01C 21/3694* (2013.01); *G01C 21/3415* (2013.01); *G01C 21/3461* (2013.01); *G01C 21/362* (2013.01); *G01C 21/3647* (2013.01); *B60R 1/00* (2013.01); *H04L 67/12* (2013.01)

(58) Field of Classification Search
CPC ............ G01C 21/3694; G01C 21/3647; G01C 21/3461; G01C 21/3415; G01C 21/362; H04L 67/12; B60R 1/00
See application file for complete search history.

(56) References Cited

U.S. PATENT DOCUMENTS

| | | | | |
|---|---|---|---|---|
| 9,094,615 | B2* | 7/2015 | Aman | G01S 3/7864 |
| 9,535,878 | B1* | 1/2017 | Brinkmann | G06F 17/00 |
| 9,679,420 | B2* | 6/2017 | Palmer | B60R 16/023 |
| 2014/0306814 | A1* | 10/2014 | Ricci | H04W 4/21 340/425.5 |
| 2014/0306834 | A1* | 10/2014 | Ricci | B60Q 1/00 340/902 |
| 2016/0042234 | A1* | 2/2016 | Chen | G06K 9/00785 382/190 |
| 2016/0123743 | A1* | 5/2016 | Sisbot | G01C 21/3461 701/538 |
| 2017/0059337 | A1* | 3/2017 | Barker | G06Q 10/047 |
| 2017/0069205 | A1* | 3/2017 | Nguyen | G08G 1/0112 |
| 2017/0195605 | A1* | 7/2017 | Alves | G06K 9/4661 |

(Continued)

FOREIGN PATENT DOCUMENTS

| | | |
|---|---|---|
| KR | 10-2014-0005423 A | 1/2014 |
| KR | 10-1392628 B1 | 5/2014 |
| KR | 10-2015-0085760 A | 7/2015 |

*Primary Examiner* — Frederick M Brushaber
(74) *Attorney, Agent, or Firm* — Sughrue Mion, PLLC (57) ABSTRACT

A method of providing a route based on surveillance zones includes: generating a total surveillance zone by displaying surveillance zones of surveillance devices on a map; if a first user requests a route, generating a route on the map based on the total surveillance zone; if an event occurs while the first user travels along the route, acquiring a surveillance image from at least one of the surveillance devices corresponding to a location at which the event occurs; and providing the surveillance image to a second user.

20 Claims, 7 Drawing Sheets

(56) References Cited

U.S. PATENT DOCUMENTS

2017/0223314 A1* 8/2017 Collings, III ........... H04W 4/90
2017/0280106 A1* 9/2017 Malik ..................... H04N 7/181
2018/0247135 A1* 8/2018 Oami ........................ G06T 7/20

* cited by examiner

METHOD AND APPARATUS FOR PROVIDING ROUTE BASED ON SURVEILLANCE ZONES

CROSS-REFERENCE TO THE RELATED APPLICATION

This application claims priority from Korean Patent Application No. 10-2016-0003323, filed on Jan. 11, 2016, in the Korean Intellectual Property Office, the disclosure of which is incorporated herein in its entirety by reference.

BACKGROUND

1. Field

Apparatuses and methods consistent with exemplary embodiments relate to providing a route based on surveillance zones, more particularly, to providing a safe route using surveillance devices.

2. Description of the Related Art

There have been increasing interest in security, and thus, the use of surveillance cameras has been expanded to many areas. Surveillance systems of the related art are configured to individually store images of allocated zones or facilities by using surveillance cameras. However, the surveillance systems of the related art are not configured to provide safe routes to users using such images.

Therefore, there is a need for a method of automatically generating safe routes using surveillance cameras installed in a plurality of zones and providing the routes to users.

SUMMARY

One or more exemplary embodiments provide a method and an apparatus for providing a route based on surveillance zones. According to the method and the apparatus, a route passing through surveillance zones is provided to a user, and if an event occurs while the user travels along the route, surveillance images related to the route are provided.

Various aspects will be set forth in part in the description which follows and, in part, will be apparent from the description, or may be learned by practice of the presented exemplary embodiments.

According to one or more exemplary embodiments, there is provided a method of providing a route based on surveillance zones. The method may include: generating a total surveillance zone by displaying surveillance zones of surveillance devices on a map; if a first user requests a route, generating a route on the map based on the total surveillance zone; if an event occurs while the first user travels along the route, acquiring a surveillance image from at least one of the surveillance devices corresponding to a location at which the event occurs; and providing the surveillance image to a second user.

The generating the total surveillance zone may include: determining safety levels of the surveillance zones of the surveillance devices based on performance indexes of the surveillance devices, respectively; and overlapping at least two of the surveillance zones with each other and raising a safety level of an overlapped region between the at least two surveillance zones.

The performance index of each of the surveillance devices may be determined by at least one of a field of view, a frame rate, a resolution, and zoom magnification of a camera of the surveillance device.

The raising of the safety level of the overlapped region may be performed by setting a highest one of safety levels of the overlapped surveillance zones as a reference, applying a weight value to a safety level of the other of the overlapped surveillance zones, and determining a sum of the reference and the weighted safety level as the safety level of the overlapped region between the at least two surveillance zones.

The generating the route may include determining whether it is possible to generate a route passing through only the total surveillance zone, wherein if it is possible to generate a route only passing through the total surveillance zone, the route may be generated based on route safety levels, and if it is not possible to generate a route passing through only the total surveillance zone, the route may be generated based on a surveillance zone ratio.

The generating the route may include: providing a plurality of candidate routes to the first user together with route safety levels and surveillance zone ratios of the candidate routes; and determining one of the candidate routes selected by the first user as an ultimate route.

The acquiring the surveillance image may include: acquiring a surveillance image from a surveillance device observing the location at which the event occurs; and acquiring a surveillance image from a surveillance device observing the route along which the first user travels.

The acquiring the surveillance image may further include acquiring a surveillance image by receiving an image from a photographing device of a vehicle located in a preset zone adjacent to the location at which the event occurs.

In the acquiring the surveillance image, if the first user deviates from the route while traveling along the route, it may be determined that the event occurs.

In the acquiring the surveillance image, if the first user does not move for a time period longer than a present reference time period while traveling along the route, it may be determined that the event occurs.

According to one or more exemplary embodiments, there is provided an apparatus for providing a route based on surveillance zones which may include: a surveillance zone generator configured to generate a total surveillance zone by displaying surveillance zones of surveillance devices on a map; a route generator configured to generate a route on the map based on the total surveillance zone in response to a route request from a first user; a surveillance image acquirer, wherein if an event occurs while the first user travels along the route, the surveillance image acquirer acquires a surveillance image from at least one of the surveillance devices corresponding to a location at which the event occurs; and a surveillance image provider configured to provide the surveillance image to a second user.

Other aspects will become apparent and more readily appreciated from the accompanying drawings, claims, and detailed description.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Reference will now be made in detail to exemplary embodiments which are illustrated in the accompanying drawings, wherein like reference numerals refer to like elements throughout. In this regard, the presented embodiments may have different forms and should not be construed as being limited to the descriptions set forth herein. Accordingly, the exemplary embodiments are merely described below, by referring to the figures, to explain aspects of the inventive concept. As used herein, the term "and/or" includes any and all combinations of one or more of the associated listed items. Expressions such as "at least one of," when preceding a list of elements, modify the entire list of elements and do not modify the individual elements of the list. Moreover, detailed descriptions related to well-known functions or configurations may be omitted in order not to unnecessarily obscure subject matters of the exemplary embodiments.

It will be understood that although the terms "first" and "second" are used herein to describe various elements, these elements should not be limited by these terms. Terms are only used to distinguish one element from other elements.

In the following descriptions of exemplary embodiments, the technical terms are used only for explaining a specific embodiment while not limiting the inventive concept. The meaning of "include" or "comprise" specifies a property, a fixed number, a step, a process, an element, a component, and a combination thereof but does not exclude other properties, fixed numbers, steps, processes, elements, components, and combinations thereof.

The exemplary embodiments, e.g., FIGS. 1-5, may be embodied as functional blocks and various processing operations. The functional blocks may be implemented with various hardware and/or software configurations executing specific functions. For example, the functional block may employ integrated circuit configurations such as a memory, a processor or processing unit, a logic unit, a look-up table and the like capable of executing various functions upon control of one or more microprocessors or other control devices. In a similar manner to that in which the elements of the embodiments may be executed with software programming or software elements, the embodiments may be implemented with a scripting language or a programming language such as C, C++, Java, assembler, and the like, including various algorithms implemented by a combination of data structures, processes, routines or other programming configurations. The functional aspects may be implemented by algorithms executed in one or more processors. Also, the exemplary embodiments may employ conversional arts to establish an electronic environment, process signals and/or process data. Terms such as "mechanism," "element," "means," and "configuration" may be widely used and are not limited to mechanical and physical configurations. Such terms may have the meaning of a series of routines of software in association with a processor or the like.

In the drawings, like reference numerals denote like elements, and overlapping descriptions thereof will be omitted.

Figure 1:
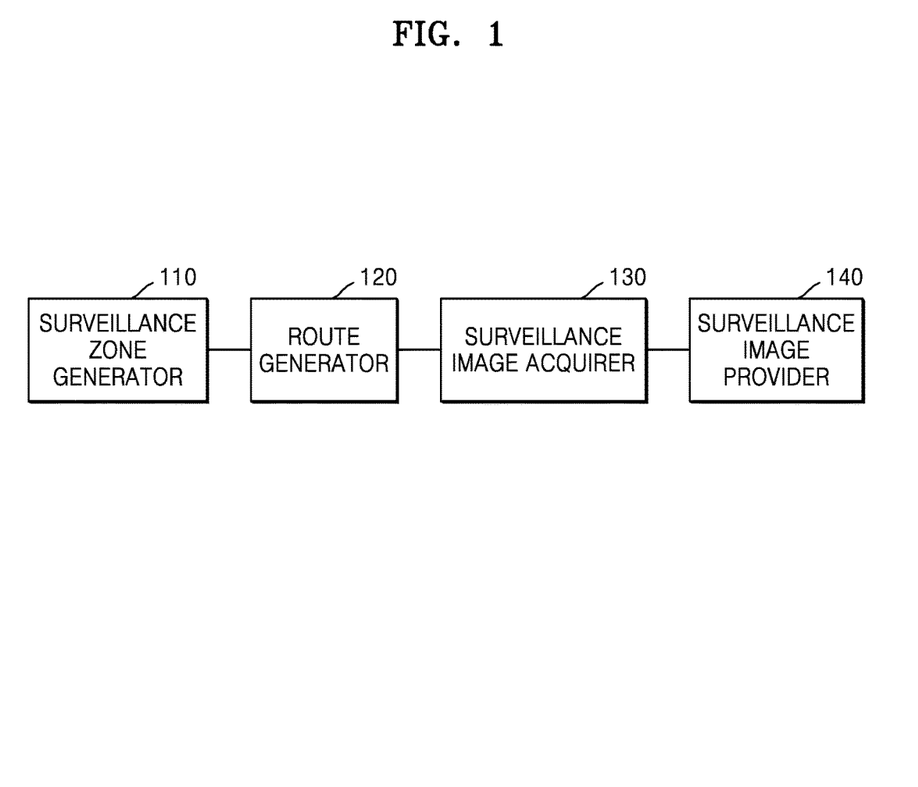
FIG. 1 is a block diagram illustrating an apparatus for providing a route based on surveillance zones, according to an exemplary embodiment.

FIG. 1 is a block diagram illustrating an apparatus for providing a route based on surveillance zones, according to an exemplary embodiment.

Referring to FIG. 1, the apparatus for providing a route based on surveillance zones according to an exemplary embodiment includes a surveillance zone generator 110, a route generator 120, a surveillance image acquirer 130, and a surveillance image provider 140.

The surveillance zone generator 110 generates surveillance zones on a map.

The surveillance zone generator 110 may generate a total surveillance zone by displaying the individual surveillance zones of respective surveillance devices on a map.

The surveillance zone generator 110 may determine a safety level of each surveillance zone based on a performance index of each surveillance device.

Herein, the performance index of each surveillance device may be determined based on at least one of a field of view, a frame rate, a resolution, and zoom magnification of a camera of the surveillance device.

For example, if the field of view, the frame rate, the resolution, and the zoom magnification of the camera of a surveillance device are wide or high, the performance index of the surveillance device may be accordingly determined as being high.

In addition, if the performance index of a surveillance device is high, the surveillance zone generator 110 may determine that the safety level of the surveillance zone of the surveillance device is high.

For example, if the performance index of a surveillance device is within a first performance range, the surveillance zone generator 110 may determine that the safety level of the surveillance zone of the surveillance device is "very good." If the performance index of a surveillance device is within a second performance range, the surveillance zone generator 110 may determine that the safety level of the surveillance zone of the surveillance device is "good." If the performance index of a surveillance device is within a third performance range, the surveillance zone generator 110 may determine that the safety level of the surveillance zone of the surveillance device is "normal." If the performance index of a surveillance device is within a fourth performance range, the surveillance zone generator 110 may determine that the safety level of the surveillance zone of the surveillance device is "low." If the performance index of a surveillance device is within a fifth performance range, the surveillance zone generator 110 may determine that the safety level of the surveillance zone of the surveillance device is "very low."

The surveillance zone generator 110 may overlap surveillance zones and may raise the safety level of an overlapped zone between the surveillance zones.

For example, if the surveillance zone generator 110 overlaps two surveillance zones each having a safety level "good," the surveillance zone generator 110 determines the safety level of an overlapped zone between the two surveillance zones to being "very good."

In an exemplary embodiment, the surveillance zone generator 110 may set the highest one of safety levels of overlapped surveillance zones as a reference and may apply weight values to safety levels of the other of the overlapped surveillance zones. Then, the surveillance zone generator 110 may determine a safety level of an overlapped zone among the surveillance zones to be a sum of the reference and weighted safety levels.

For example, the surveillance zone generator 110 may assign numeral values to safety levels: 5 points to the safety level "very good," 4 points to the safety level "good," 3 points to the safety level "normal," 2 points to the safety level "low," and 1 point to the safety level "very low." If two surveillance zones each having a safety level "good" are overlapped with each other, 4 points corresponding to the safety level "good" that is the safety level of one of the two surveillance zones may be set as a reference, and a weight value of 0.5 may be applied to 4 points corresponding to the safety level "good" that is the safety level of the other of the two surveillance zones, resultantly making 2 points. Then, the safety level "very good" corresponding to 6 points obtained by summing 4 points and 2 points may be determined as the safety level of an overlapped zone between the two surveillance zones.

In this case, a weight value of 1, as a reference value, may be applied to a surveillance zone having the highest safety level, another weight value of 0.5 may be applied to a surveillance zone having the second highest safety level, and another weight value of 0.25 may be applied to a surveillance zone having the third highest safety level.

The route generator 120 may generate a route on a map based on the surveillance zones.

The route generator 120 may generate a route in response to a user request.

In this case, the user may be a person using a terminal receiving route information.

The route generator 120 determines whether it is possible to generate a route passing through only the total surveillance zone, and if so, the route generator 120 may generate a route based on route safety levels.

For example, if it is possible to generate a route passing through only the total surveillance zone, the route generator 120 may generate a route having the highest route safety level.

Here, the route safety level may be the average of safety levels of surveillance zones through which the route is provided.

For example, if 40% of surveillance zones through which the route passes have a safety level of 4 points, and 60% of the surveillance zones through which the route passes have a safety level of 6 points, the route safety level may be 5.2 points (4*0.4+6*0.6=5.2).

If it is impossible to generate a route passing through only the total surveillance zone, the route generator 120 may generate a route based on a surveillance zone ratio.

For example, if it is impossible to generate a route passing through only the total surveillance zone, the route generator 120 may generate a route having the highest surveillance zone ratio, e.g., a route passing as many surveillance zones as possible.

Meanwhile, the route generator 120 generates a plurality of candidate routes. In this case, the route generator 120 provides the candidate routes to a user together with route safety levels and surveillance zone ratios of the candidate routes, and the route generator 120 determines a route selected by the user as an ultimate route.

The surveillance image acquirer 130 acquires surveillance images if an event occurs when a user travels along a route.

The surveillance image acquirer 130 may acquire surveillance images from at least one surveillance device corresponding to a location at which an event occurs.

In an exemplary embodiment, the surveillance image acquirer 130 may acquire surveillance images from surveillance devices observing a route along which a user travels.

In an exemplary embodiment, the surveillance image acquirer 130 may acquire surveillance images by receiving images from photographing devices of vehicles located in preset zones adjacent to a location at which an event occurs.

Here, an event may refer to an unexpected situation that a user faces while traveling along a route, or a predetermined event.

In an exemplary embodiment, if a user deviates from a given route while traveling along the route, the surveillance image acquirer 130 may determine that an event occurs.

In an exemplary embodiment, if a user traveling along a route does not move for a time period longer than a preset reference time period, the surveillance image acquirer 130 may determine that an event occurs.

The surveillance image provider 140 may provide surveillance images to a user. Here, the user receiving the surveillance images from the surveillance image provider 140 may be a person using a terminal providing route information. That is, a user terminal requesting a route and receiving route information may be different from a user terminal receiving surveillance images.

Figure 2:
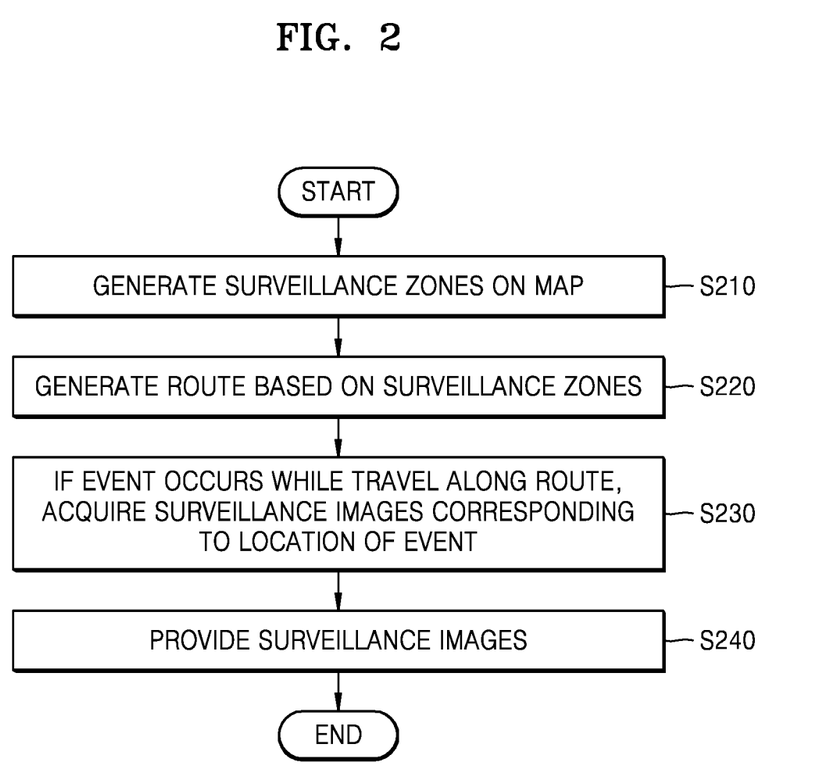
FIG. 2 is a flowchart illustrating a method of providing a route based on surveillance zones, according to an exemplary embodiment.

FIG. 2 is a flowchart illustrating a method of providing a route based on surveillance zones, according to an exemplary embodiment.

Referring to FIG. 2, the surveillance zone generator 110 (refer to FIG. 1) generates surveillance zones on a map (S210).

In operation S210, the surveillance zone generator 110 (refer to FIG. 1) may generate a total surveillance zone by overlapping individual surveillance zones of surveillance devices.

Next, the route generator 120 (refer to FIG. 1) generates a route based on the surveillance zones (S220).

In operation S220, the route generator 120 (refer to FIG. 1) determines whether it is possible to generate a route passing through only the total surveillance zone, and if so, the route generator 120 may generate a route based on a route safety level.

Next, if an event occurs while a user travels along the route, the surveillance image acquirer 130 (refer to FIG. 1) acquires images corresponding to a location at which the event occurs (S230).

In operation S230, the surveillance image acquirer 130 (refer to FIG. 1) may acquire surveillance images from surveillance devices observing the route along which the user travels.

Finally, the surveillance image provider 140 (refer to FIG. 1) provides the surveillance images (S240).

Figure 3:
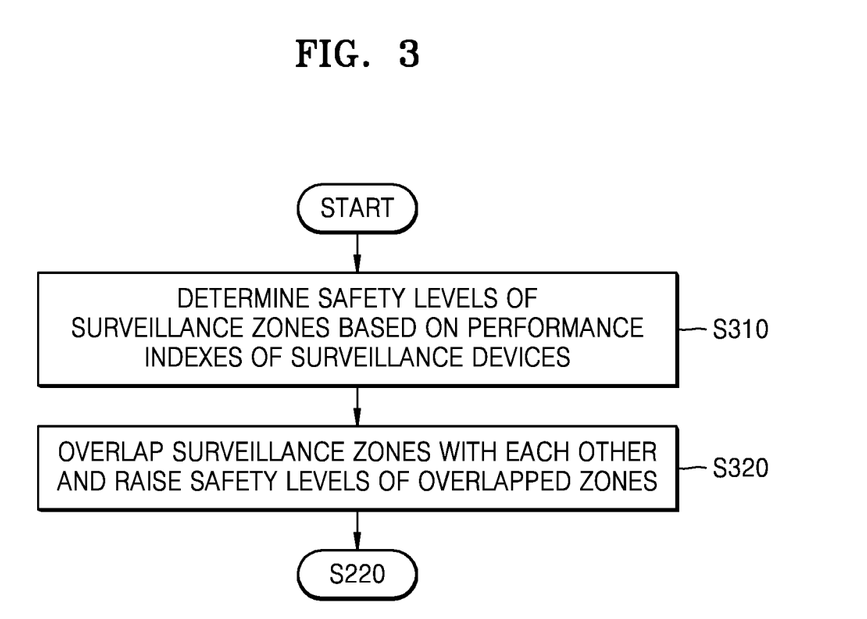
FIG. 3 is a flowchart illustrating an example of an operation illustrated in FIG. 2 in which surveillance zones are generated on a map, according to an exemplary embodiment.

FIG. 3 is a flowchart illustrating an example of operation S210 illustrated in FIG. 2 in which surveillance zones are generated on a map.

Referring to FIG. 3, in operation S210 illustrated in FIG. 2 in which surveillance zones are generated on a map, the surveillance zone generator 110 (refers to FIG. 1) determines safety levels of the surveillance zones based on performance indexes of surveillance devices (S310).

In operation S310, if a performance index of a surveillance device is high, the surveillance zone generator 110 (refer to FIG. 1) may determine that a safety level of the surveillance zone of the surveillance device is high.

Next, in operation S210 illustrated in FIG. 2 in which the surveillance zones are generated on a map, the surveillance zone generator 110 (refers to FIG. 1) overlaps two or more of the surveillance zones and raises safety levels of overlapped zones (S320).

In operation S320, the surveillance zone generator 110 (refer to FIG. 1) may set the highest one of safety levels of the overlapped surveillance zones as a reference and may apply weight values to safety levels of the other overlapped surveillance zones. Then, the surveillance zone generator 110 may raise a safety level of an overlapped zone among the surveillance zones to a sum of the reference and weighted safety levels.

Figure 4:
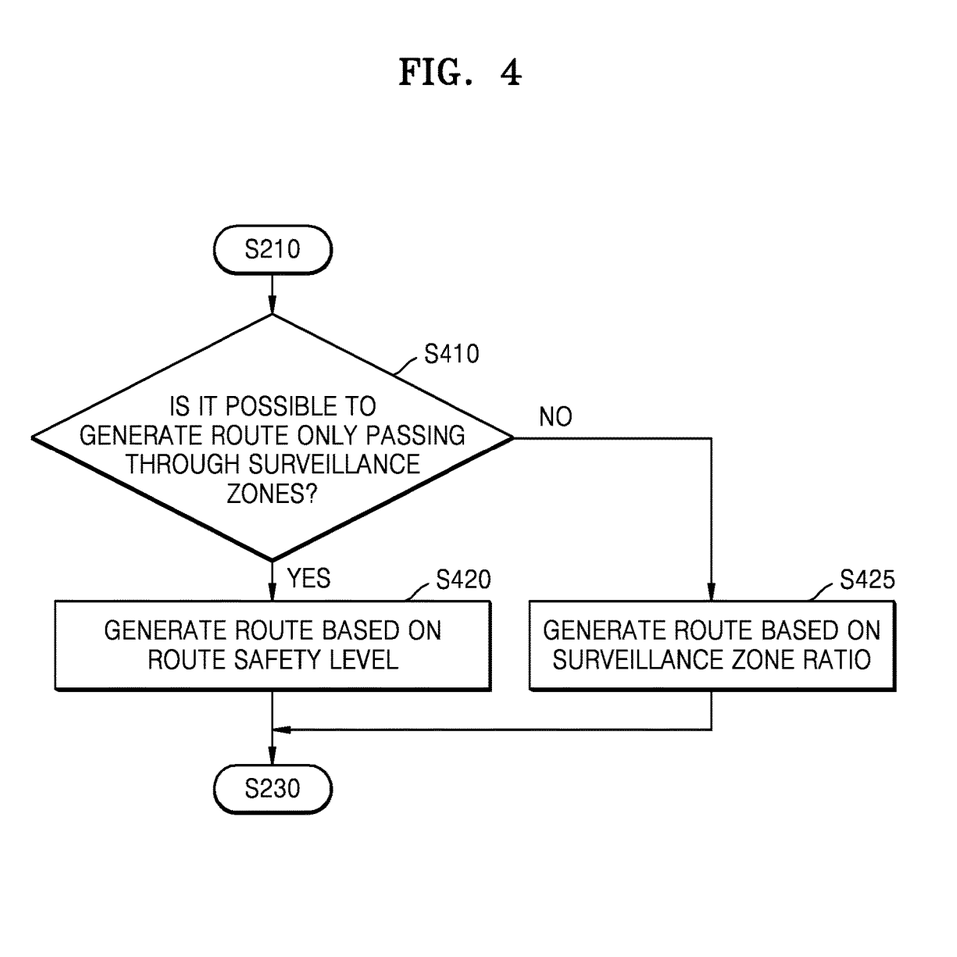
FIG. 4 is a flowchart illustrating an example of an operation illustrated in FIG. 2 in which a route is generated based on surveillance zones, according to an exemplary embodiment.

FIG. 4 is a flowchart illustrating an example of operation S220 illustrated in FIG. 2 in which a route is generated based on surveillance zones.

Referring to FIG. 4, in operation S220 illustrated in FIG. 2 in which a route is generated based on surveillance zones, the route generator 120 (refers to FIG. 1) determines whether it is possible to generate a route passing through only surveillance zones (S410).

In operation S410, if the route generator 120 determines that it is possible to generate a route passing through only surveillance zones, the surveillance zone based route generating operation S220 illustrated in FIG. 2 includes operation S420 in which the route generator 120 (refer to FIG. 1) generates a route based on safety levels.

In operation S420, the route generator 120 (refer to FIG. 1) may generate a route in such a manner that a safety level of the route may be as high as possible.

In operation S410, if the route generator 120 determines that it is impossible to generate a route passing through only the surveillance zones, the surveillance zone based route generating operation S220 illustrated in FIG. 2 includes operation S425 in which the route generator 120 (refer to FIG. 1) generates a route based on a surveillance zone ratio.

In operation S425, the route generator 120 (refer to FIG. 1) may generate a route based on the surveillance zone ratio.

Figure 5:
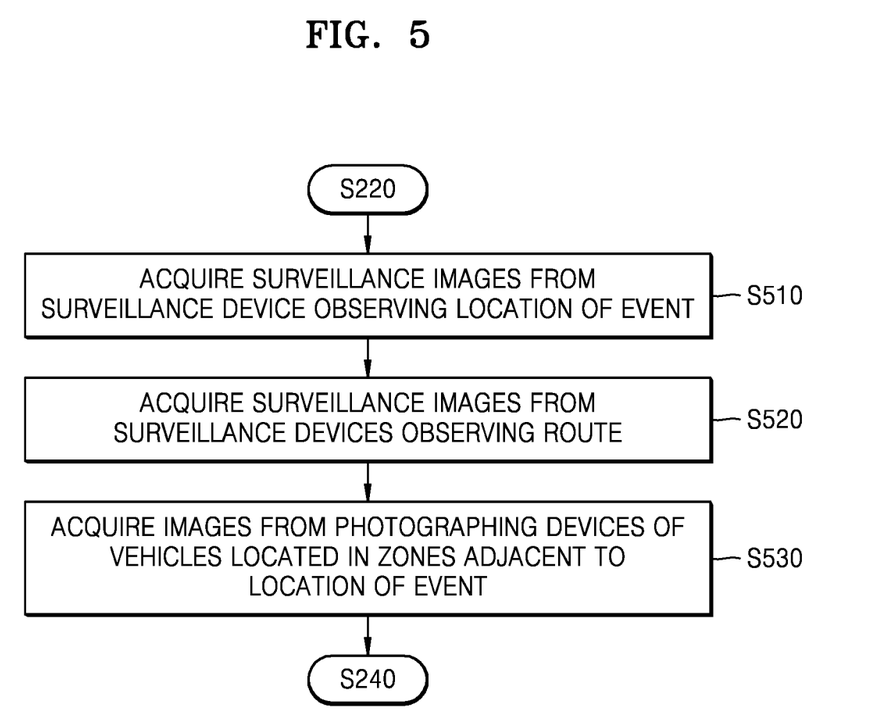
FIG. 5 is a flowchart illustrating an example of an operation illustrated in FIG. 2 in which if an event occurs while travel along a route, surveillance images corresponding to a location at which an event occurs are acquired, according to an exemplary embodiment.

FIG. 5 is a flowchart illustrating an example of operation S230 illustrated in FIG. 2 in which if an event occurs while travel along a route, surveillance images corresponding to a location at which the event occurs are acquired.

Referring to FIG. 5, in operation S230 illustrated in FIG. 2 in which if an event occurs while travel along a route, surveillance images corresponding to a location at which the event occurs are acquired, the surveillance image acquirer 130 (refer to FIG. 1) acquires surveillance images from a surveillance device observing the location of the event (S510).

Next, in operation S230 illustrated in FIG. 2 in which if an event occurs while travel along a route, surveillance images corresponding to a location at which the event occurs are acquired, the surveillance image acquirer 130 (refer to FIG. 1) acquires surveillance images from surveillance devices observing the route (S520).

Next, in operation S230 illustrated in FIG. 2 in which if an event occurs while travel along a route, surveillance images corresponding to a location at which the event occurs are acquired, the surveillance image acquirer 130 (refer to FIG. 1) acquires surveillance images from photographing devices of vehicles located in zones adjacent the location of the event (S530).

Figure 6:
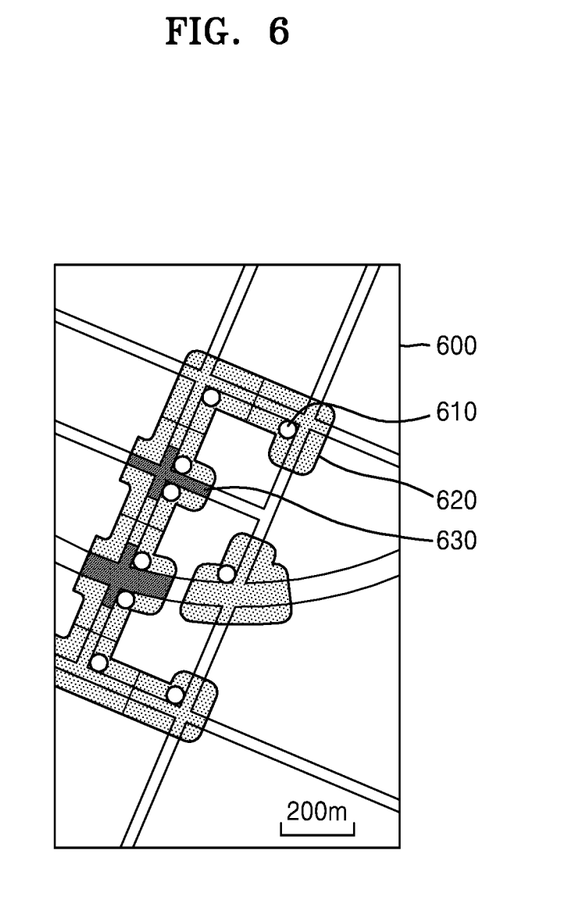
FIG. 6 illustrates an example of a screen of a user terminal running a user application by a method of providing a route based on surveillance zones, according to an exemplary embodiment.

FIG. 6 illustrates an example of a screen of a user terminal running a user application by a method of providing a route based on surveillance zones, according to an exemplary embodiment.

In the example illustrated in FIG. 6, surveillance zones and safety levels of the surveillance zones are shown on a map.

Surveillance devices 610 may be displayed on a map image 600.

In addition, surveillance zones 620 of the surveillance devices 610 may also be displayed on the map image 600.

The surveillance zones 620 may be displayed with different colors according to the safety levels of the surveillance zones 620.

For example, the safety levels of the surveillance zones 620 may be graded as "very good," "good," "normal," "low," and "very low." The safety levels "very good," "good," "normal," "low," and "very low" may be indicated with blue, green, yellow, orange, and red, respectively.

The safety levels of overlapped zones 630 between the surveillance zones 620 may be raised, and the overlapped zones 630 may be displayed to be distinguishable with non-overlapped zones.

For example, the surveillance zone generator 110 may respectively assign numerical values of 5 points, 4 points, 3 points, 2 points, and 1 point to the safety levels "very good," "good," "normal," "low," and "very low." If two surveillance zones 620 each having a safety level "good" are overlapped with each other, 4 points corresponding to the safety level "good" that is the safety level of one of the two surveillance zones 620 may be set as a reference, and a weight value of 0.5 may be applied to 4 points corresponding to the safety level "good" that is the safety level of the other of the two surveillance zones 620, resultantly making 2 points. Then, the safety level "very good" corresponding to 6 points obtained by summing 4 points and 2 points may be determined as the safety level of an overlapped zone 630 between the two surveillance zones 620.

In this case, the two surveillance zones 620 having a safety level "good" may be indicated with green, and the overlapped zone 630 having a safety level "very good" may be indicated with blue.

Figure 7:
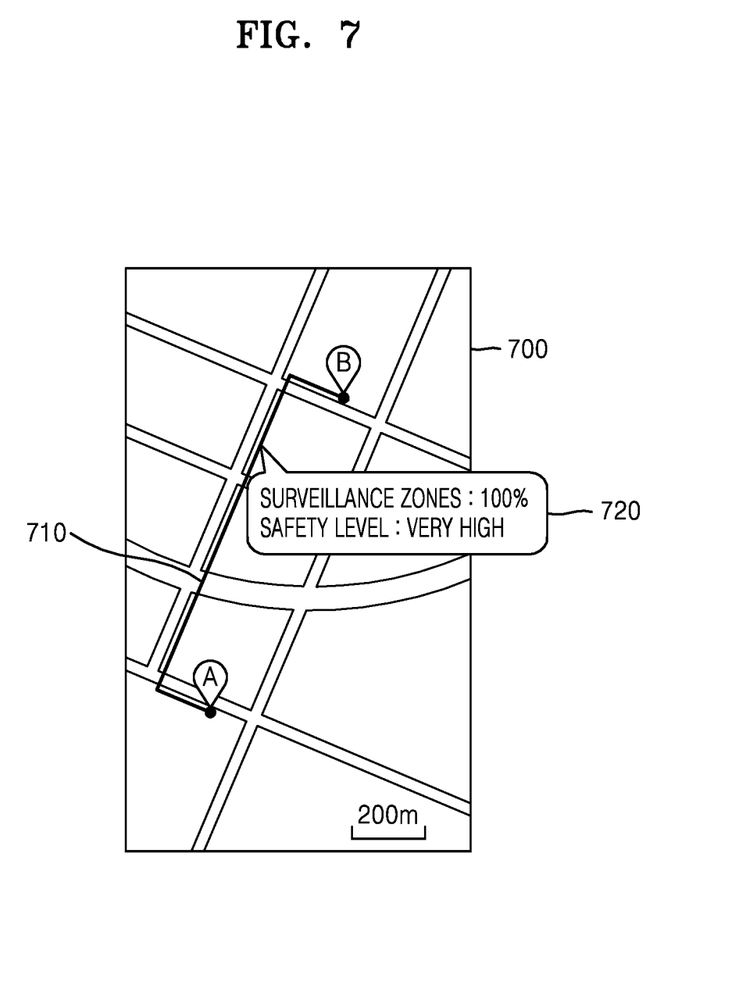
FIG. 7 illustrates another example of a screen of a user terminal running a user application by the method of providing a route based on surveillance zones, according to another exemplary embodiment.

FIG. 7 illustrates another example of a screen of a user terminal running a user application by the method of providing a route based on surveillance zones, according to another exemplary embodiment.

In the example illustrated in FIG. 7, a route may be provided on a map based on surveillance zones.

A starting point A and a destination B may be displayed on a map screen 700.

The starting point A and the destination B may be points input by a user.

In an exemplary embodiment, the current location of a user may be automatically detected and set as the starting point A.

In addition, a route 710 from the starting point A to the destination B may be displayed on the map screen 700.

The route 710 may be generated based on the surveillance zones 620 shown in FIG. 6.

In addition, the surveillance zone ratio and safety level of the route 710 may be displayed on the map screen 700 as additional information 720.

For example, if the surveillance zone ratio of the route 710 is 100%, and the average safety level of surveillance zones across which the route 710 is provided is 5.2 points, additional information 720 may be displayed in the following form: "surveillance zones: 100%, safety level: very high."

The above-described exemplary embodiments may be implemented in the form of computer programs executable on a computer using various components, and such computer programs may be stored in computer readable media. Examples of the computer readable media may include: magnetic media such as hard disks, floppy disks, and magnetic tapes; optical recording media such as CD-ROMs and DVDs; magneto-optical media such as floptical disks; and hardware such as ROMs, RAMs, and flash memories specifically configured to store program instructions and execute the program instructions. Examples of the computer readable media may include intangible media that may be transferred over network. For example, the computer readable media may be implemented in the form of software or applications that may also be transferred and distributed over network.

In addition, the computer programs may be those designed and configured according to the embodiments or well known in the computer software industry. Examples of the computer programs may include machine codes made by compilers and high-level language codes executable on computers using interpreters.

In addition, the above-described operations or exemplary embodiments are examples which are not intended to limit the scope and spirit of the inventive concept. In the present disclosure, descriptions of known electric components, control systems, software, and other functional aspects thereof may not be given for conciseness. Furthermore, in the drawings, connection lines or members between elements are exemplary functional, physical, and/or electric connections that may be replaced with or used together with other functional, physical, and/or electrical connections. Elements described without using terms such as "essential" and "important" may not be necessary for constituting the inventive concept.

That is, the scope of the inventive concept is not limited to the exemplary embodiments described above but should be defined by the appended claims and equivalents thereof.

As described above, according to the method and the apparatus for providing a route based on surveillance zones of the one or more of the above exemplary embodiments, a route passing through surveillance zones is provided to a user, and if an event occurs while the user travels along the route, surveillance images related to the route are provided.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method of operating an apparatus for displaying a route based on surveillance zones, the method comprising:

generating, by using at least one processor of the apparatus, a total surveillance zone defined by surveillance zones, the surveillance zones being observed by surveillance devices and displayed on a map on a terminal of a first user;

generating, by using the at least one processor of the apparatus, a route on the map based on the total surveillance zone and displaying the route on the terminal of the first user in response to a request for the route from the terminal of the first user;

in response to detection of an event with respect to the first user on the route, acquiring, by using the at least one processor of the apparatus, a surveillance image from at least one of the surveillance devices corresponding to a location at which the event is detected; and displaying, by using the at least one processor of the apparatus, the surveillance image on a terminal of a second user.

2. The method of claim 1, wherein the generating the total surveillance zone comprises:

determining safety levels of the surveillance zones observed by the surveillance devices based on performance indexes of the surveillance devices, respectively; and overlapping at least two surveillance zones of the surveillance zones with one another and increasing a safety level of an overlapped zone between the at least two surveillance zones to be greater than each of safety levels of the at least two surveillance zones.

3. The method of claim 2, wherein a performance index of each of the surveillance devices is determined by at least one of a field of view, a frame rate, a resolution, and zoom magnification of a camera of each of the surveillance devices.

4. The method of claim 2, wherein the increasing the safety level of the overlapped zone is performed by setting a highest one of safety levels of the overlapped at least two surveillance zones as a reference, applying a weight value to a safety level of another one of the overlapped at least two surveillance zones, and determining a sum of the reference and a weighted safety level as the safety level of the overlapped zone between the at least two surveillance zones.

5. The method of claim 2, wherein the generating the route comprises determining whether it is possible to generate the route passing through only the total surveillance zone, wherein the route is generated based on a route safety level in response to generation of the route passing through only the total surveillance zone being possible, and the route is generated based on a surveillance zone ratio in response to the generation of the route passing through only the total surveillance zone being not possible.

6. The method of claim 5, wherein the displaying the route comprises:

displaying a plurality of candidate routes on the terminal of the first user together with route safety levels and surveillance zone ratios of the plurality of candidate routes; and determining one of the plurality of candidate routes selected by the first user as an ultimate route.

7. The method of claim 5, wherein the acquiring the surveillance image comprises:

acquiring a surveillance image from a first surveillance device observing the location at which the event is detected; and acquiring a surveillance image from a second surveillance device observing the route along which the first user travels.

8. The method of claim 7, wherein the acquiring the surveillance image further comprises acquiring a surveillance image by receiving an image from a photographing device of a vehicle located in a preset zone adjacent to the location at which the event is detected.

9. The method of claim 7, wherein the event is detected in response to deviation of the first user from the route while traveling along the route.

10. The method of claim 7, wherein the event is detected in response to the first user not moving for a time period longer than a preset reference time period while traveling along the route.

11. An apparatus for displaying a route based on surveillance zones, the apparatus comprising:
at least one memory configured to store program code; and
at least one processor instructed by the program code and configured to:
generate a total surveillance zone defined by surveillance zones, the surveillance zones observed by surveillance devices and displayed on a map on a terminal of a first user;
generate a route on the map based on the total surveillance zone and display the route on a display of the terminal of the first user, in response to a request for the route from the terminal of the first user;
in response to detection of an event with respect to the first user on the route, acquire a surveillance image from at least one of the surveillance devices corresponding to a location at which the event is detected; and
display the surveillance image on a terminal of a second user.

12. The apparatus of claim 11, wherein the at least one processor is configured to generate the total surveillance zone by determining safety levels of the surveillance zones observed by the surveillance devices based on performance indexes of the surveillance devices, respectively, overlapping at least two surveillance zones of the surveillance zones, and increasing a safety level of an overlapped zone between the at least two surveillance zones to be greater than each of safety levels of the at least two surveillance zones.

13. The apparatus of claim 12, wherein a performance index of each of the surveillance devices is determined by at least one of a field of view, a frame rate, a resolution, and zoom magnification of a camera of each of the surveillance devices.

14. The apparatus of claim 12, wherein the at least one processor is configured to increase the safety level of the overlapped zone by setting a highest one of safety levels of the overlapped at least two surveillance zones as a reference, applying a weight value to a safety level of another one of the overlapped at least two surveillance zones, and determining a sum of the reference and a weighted safety level as the safety level of the overlapped zone between the at least two surveillance zones.

15. The apparatus of claim 12, wherein the at least one processor is configured to determine whether it is possible to generate the route passing through only the total surveillance zone,
wherein in response to generation of the route passing through only the total surveillance zone being possible, the at least one processor is configured to generate the route based on a route safety level, and in response to the generation of the route passing through only the total surveillance zone being not possible, the at least one processor is configured to generate the route based on a surveillance zone ratio.

16. The apparatus of claim 15, wherein the at least one processor is configured to generate a plurality of candidate routes, display the plurality of candidate routes on the terminal of the first user together with route safety levels and surveillance zone ratios of the plurality of candidate routes, and determine one of the plurality of candidate routes which is selected by the first user as an ultimate route.

17. The apparatus of claim 15, wherein the at least one processor is configured to acquire a surveillance image from a first surveillance device observing the location at which the event is detected and from a second surveillance device observing the route along which the first user travels.

18. The apparatus of claim 17, wherein the at least one processor is configured to acquire a surveillance image by receiving an image from a photographing device of a vehicle located in a preset zone adjacent to the location at which the event is detected.

19. The apparatus of claim 17, wherein the at least one processor is configured to detect the event in response to deviation of the first user from the route.

20. The apparatus of claim 17, wherein the at least one processor is configured to detect the event in response to movement of the first user not being detected for a time period longer than a preset reference time period.

* * * * *